Patented Apr. 6, 1943

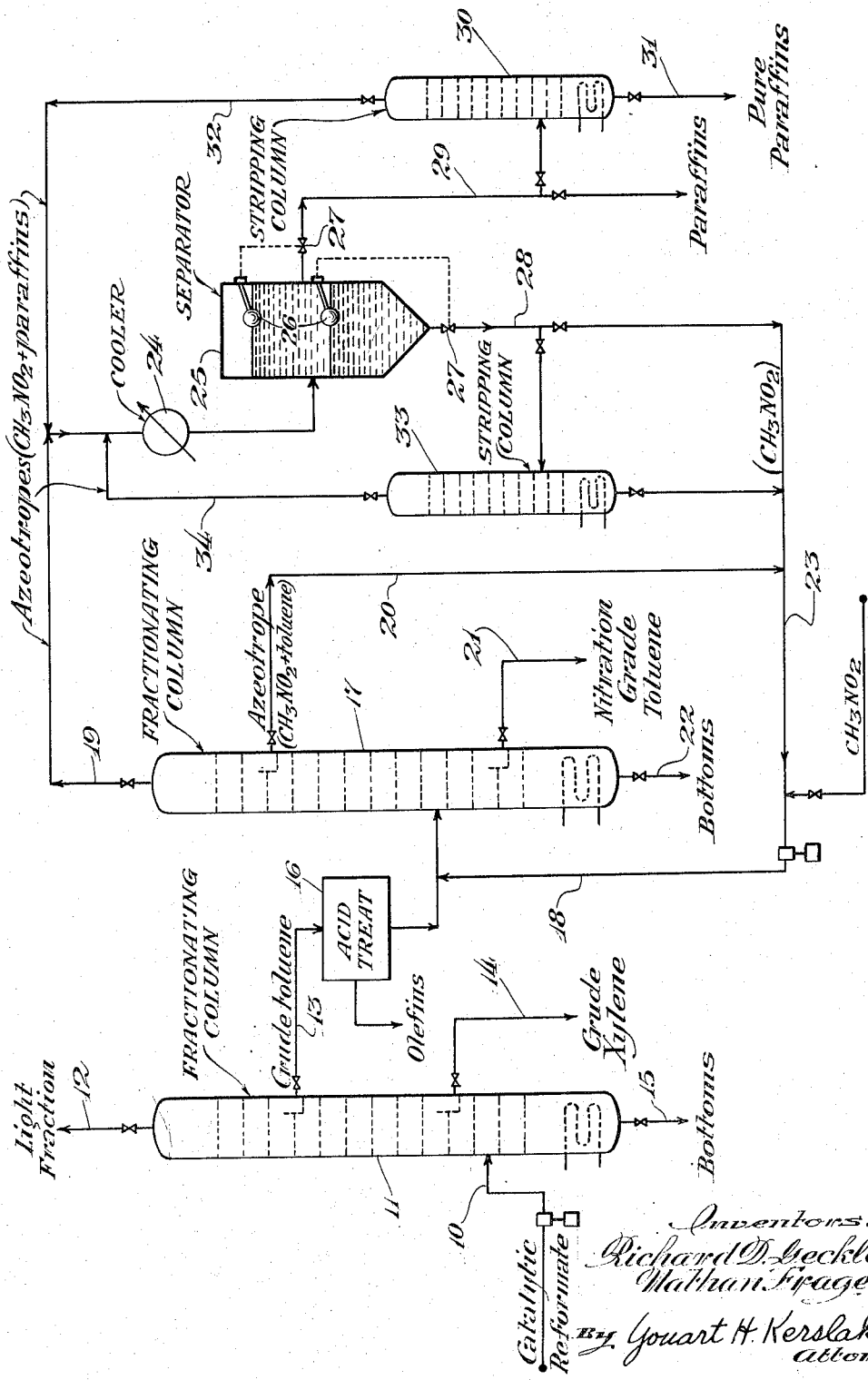

2,316,126

UNITED STATES PATENT OFFICE 2,316,126

METHOD OF PRODUCING TOLUENE

Richard D. Geckler, Whiting, and Nathan Fragen, Hammond, Ind., assignors to Standard Oil Company, Chicago, Ill., a corporation of Indiana Application March 14, 1941, Serial No. 383,336

10 Claims. (Cl. 202—42)

The present invention relates to a method of separating toluene from a hydrocarbon mixture containing paraffins and aromatics including toluene.

It is known that catalytic reforming processes of the type commonly known as catalytic reforming in the presence of hydrogen and as dehydroaromatization convert low octane number naphthas into gasolines containing large amounts of aromatics including toluene. Toluene is a valuable hydrocarbon for certain chemical and industrial purposes, particularly for the manufacture of explosives. When catalytic reformate is distilled by ordinary processes the toluene cut is contaminated with considerable quantities of aliphatic hydrocarbons of about the same boiling point range. This contamination renders the toluene unsuitable for nitration or other chemical purposes. It is therefore an object of the present invention to provide an improved method and means for obtaining a pure toluene for catalytic reformate or other hydrocarbon mixtures.

While the present invention will be described with particular reference to catalytic reformate it will be understood that the process may be applied to any hydrocarbon mixture containing toluene and other substances having boiling points near that of toluene, under which circumstances separation by ordinary distillation would be impractical.

In the following description the process is described as if carried out at atmospheric pressure. It will be understood, however, that subatmospheric pressures and superatmospheric pressures may be used without departing from the invention. Obviously, under such circumstances the boiling points of the various cuts and mixtures will vary but such variations will not affect the desired separations.

It has been found that nitromethane (boiling point 213.8° F.) forms azeotropic mixtures with paraffin hydrocarbons. The present invention, however, deals principally with nitromethane-paraffin azeotropes boiling between 165° F. to 195° F. in which the paraffin component normally has a boiling point range between 195° F. and 245° F., which includes the boiling point of toluene. Nitromethane also forms an azeotrope with toluene, which azeotrope boils at about 202°–204° F. In view of these phenomena it is possible to separate toluene from paraffin hydrocarbons having similar boiling points by distilling them off in admixture with nitromethane. Nitromethane is particularly adaptable as an azeotrope forming substance since it may be separated from the paraffin hydrocarbons after distillation by merely condensing the vapors, the resulting liquid forming two separate layers. Usually it is necessary to separate the components of an azeotropic mixture by extracting one component with a selective solvent. This latter step is entirely dispensed with by the use of nitromethane.

The procedural steps according to the present invention will be more clearly understood by referring to the drawing attached hereto and forming a part of this specification. The drawing represents a schematic flow diagram of the process.

In carrying out the present invention catalytic reformate containing a substantial amount of toluene is introduced through line 10 to fractionating column 11. A light fraction boiling below 195° F. is withdrawn at the top of the column through line 12. A crude toluene cut boiling between 195° F. and 245° F. is withdrawn at the side of column 11 through line 13. The crude toluene contains from 40% to 98% pure toluene and consists of 80% to 100% of all the toluene originally present in the reformate. Near the bottom of column 11 a cut of crude xylene can be withdrawn through draw-off 14 if desired. The bottoms are withdrawn through line 15.

The crude toluene in line 13 may be acid treated, as in treater 16, in order to remove olefins and other contaminating substances which may be present. This acid treating step may be followed, if desired, by an alkali washing step to remove acidic components. Following the acid treatment nitromethane is added through line 18 to the crude toluene and the mixture introduced into a second fractionating column 17. Obviously the crude toluene and nitromethane can be passed through a mixing device, if desired. The amount of nitromethane which is added is approximately 50% to 60% by volume of the aliphatic hydrocarbons which are present in the crude toluene. The nitromethane forms low boiling azeotropes with the paraffin hydrocarbon constituents and also an azeotrope with the toluene which boils at a slightly higher temperature than the first-mentioned azeotropes. The nitromethane-paraffin azeotropes which boil between 165° F. and 195° F., when the crude toluene has an initial boiling point of about 200° F. are withdrawn from the top of fractionating column 17 through line 19 while the nitromethane-toluene azeotrope boiling between 202° F. and 204° F. is withdrawn through line 20. The last-mentioned azeotrope will only be formed if the quantity of nitromethane added to the system is in excess of the amount required to form the nitromethane-paraffin azeotrope. It is desirable to use such an excess of nitromethane in order to ensure a complete separation of the paraffin hydrocarbons boiling between 195° F. and 245° F. from the toluene. At or near the bottom of fractionating column 17 a pure grade of toluene is withdrawn. Paraffin hydrocarbons having a true boiling point up to 245° F. will be removed as azeotropes boiling below the boiling point of the nitromethane-toluene azeotrope.

It is advantageous to carry out the first fractionation in tower 11 carefully in order to separate as much crude toluene from paraffin hydrocarbons boiling above 245° F. as possible, otherwise it is necessary to remove the pure toluene from paraffin hydrocarbons boiling above 245° F. in the second fractionation column 17. In this latter case the toluene is withdrawn through line 21 while the bottoms consisting of heavy hydrocarbons are removed through line 22.

In case toluene is withdrawn from the bottom of tower 17 and is contaminated with some paraffin hydrocarbons boiling above 245° F. it is desirable to distill the contaminated toluene in order to separate the toluene from such hydrocarbons. Paraffins obtained in this manner can be added to the paraffins obtained as hereinafter described. The pure toluene meets all requirements for use in the manufacture of explosives. The amount of pure toluene obtained may be about 90%, based on the amount of toluene in the crude toluene fraction introduced into column 17.

If desired the acid treatment of the crude toluene can be eliminated and, instead, the toluene obtained from column 17 can be treated with acid, neutralized, washed and distilled to remove any polymers which may be present.

The nitromethane-toluene azeotrope is passed through line 20 and then line 23 to line 18, and so reintroduced into fractionating column 17 along with fresh quantities of crude toluene. The amount of pure nitromethane fed to column 17 should be so adjusted that the size of the stream of nitromethane-toluene azeotrope is not excessive. That is, the amount of pure nitromethane added through line 18 is limited to that necessary as makeup for any small amount of nitromethane lost in the process. The nitromethane-paraffin azeotropes are passed through cooler 24 into a separator 25. These azeotropes when cooled to 80-90° F. separate into substantially pure layers of paraffin hydrocarbons and nitromethane. The upper paraffin hydrocarbon layer contains only about 3% to 5% dissolved nitromethane while the lower nitromethane layer contains only about 10% to 15% dissolved paraffin hydrocarbons. Separators, other than the type shown in the drawing, may be used when desirable. The separator should, however, be of the type which will operate continuously.

The separator shown in the drawing is equipped with floats 26 which operate outlet valves 27 and thus maintain a constant level of both the nitromethane layer and the paraffin hydrocarbon layer. This lower nitromethane layer is passed through line 28 to line 23 where it is mixed with the nitromethane-toluene azeotrope from line 20 and then recirculated to fractionating column 17.

If desired the nitromethane layer, containing about 10% to about 15% paraffin hydrocarbons can be stripped in a separate column 33 so as to obtain an overhead stream of nitromethane-paraffin azeotropes, which can be returned to cooler 24 through line 34 and a substantially pure nitromethane bottom which can be returned to column 17 through lines 23 and 18. The paraffin hydrocarbon layer containing a small amount of nitromethane, however, can be passed through line 29 into stripping column 30 where azeotropes of nitromethane and paraffin hydrocarbons are separated from a large proportion of the paraffin hydrocarbons present. The latter are withdrawn from the bottom of the stripper through line 31 and can be used in any desired manner. The nitromethane-paraffin azeotropes are withdrawn from the stripper through line 32 and returned to the separator 25 through the cooler 24 along with the nitromethane-paraffin azeotropes in line 19. This stripping step should be eliminated whenever the cost of recovering the nitromethane exceeds the value of the material itself.

Since a very efficient separation of nitromethane from the nitromethane-paraffin azeotropes is possible very little nitromethane is lost and the process is therefore economical to operate. The toluene obtained by this process meets the following specifications:

Color_____ About 25 Saybolt
Insoluble material_____ Not over 0.10%
Separated water_____ None
Paraffines (by
  sulfonation)_____ None
Color of acid wash____ Not darker than 4 N. P. A.
Specific gravity,
  15.5°/15.5° C_____ 0.868–0.872
Distillation:
  Initial—not less
    than_____ 109.4° C.
  5%—not less than_ 109.7° C.
  95%—not more
    than_____ 111.0° C.
  Dry point—not
    more than_____ 111.2° C.

Having described our invention and the manner in which the same is to be carried out, what we claim is.

1. A process for treating a crude toluene cut containing toluene and paraffin hydrocarbons at least some of which have normal boiling points between about 195° F. and about 245° F. to separate the toluene from the paraffin hydrocarbons having normal boiling points below about 245° F., comprising adding nitromethane to said cut in an amount sufficient to form azeotropes with substantially all of the paraffin hydrocarbons having normal boiling points below 245° F., and distilling the resulting mixture to obtain a distillate containing nitromethane-paraffin hydrocarbon azeotropes normally boiling below about 195° F., and a residue containing toluene.

2. A process for treating a crude toluene cut containing toluene and paraffin hydrocarbons at least some of which have normal boiling points between about 195° F. and about 245° F. to separate substantially pure toluene from said paraffin hydrocarbons comprising adding nitromethane to said cut in an amount sufficient to form azeotropes with substantially all of the paraffin hydrocarbons having normal boiling points below 245° F. and distilling the resulting mixture to obtain a distillate containing nitromethane-paraffin hydrocarbon azeotropes normally boiling below about 195° F., a substantially pure toluene cut and a residue containing paraffin hydrocarbons normally boiling above about 245° F.

3. A process for treating a crude toluene cut consisting substantially of toluene and paraffin hydrocarbons having normal boiling points above about 195° F., to separate the toluene from paraffin hydrocarbons having normal boiling points between about 195° F. and about 245° F., comprising adding nitromethane to said cut in an amount sufficient to form azeotropes with substantially all of the paraffin hydrocarbons having normal boiling points below about 245° F., and distilling the resulting mixture to obtain a distillate containing nitromethane-paraffin hydrocarbon azeotropes normally boiling below about 195° F., and a residue containing toluene.

4. A process for treating a crude toluene cut consisting substantially of toluene and paraffin hydrocarbons having normal boiling points below about 245° F. to separate the toluene from said paraffin hydrocarbons comprising adding nitromethane to said cut in an amount sufficient to form azeotropes with substantially all of said paraffin hydrocarbons and distilling the resulting mixture to obtain a distillate containing nitromethane-paraffin hydrocarbon azeotropes normally boiling below about 195° F., and a residue consisting of substantially pure toluene.

5. A process for treating a crude toluene cut consisting substantially of toluene and paraffin hydrocarbons having normal boiling points between about 195° F. and about 245° F. to separate the toluene therefrom, comprising adding nitromethane to said cut in an amount sufficient to form azeotropes with substantially all of said paraffin hydrocarbons, and distilling the resulting mixture to obtain a distillate containing nitromethane-paraffin hydrocarbon azeotropes normally boiling between about 165° F. and about 195° F., and a residue consisting of substantially pure toluene.

6. A process as claimed in claim 5 wherein the nitromethane is added to the crude toluene cut in amounts of from about 50% to about 60% based on the amount of said paraffin hydrocarbons contained in the crude toluene cut.

7. A process for separating substantially pure toluene from a crude toluene cut containing paraffin hydrocarbons having boiling points between about 195° F. and about 245° F. and at least 40% toluene, comprising mixing about 50% to about 60% nitromethane, based on the amount of said paraffin hydrocarbons, with the crude toluene cut, fractionally distilling the resulting mixture to obtain substantially pure toluene, a mixture of paraffin-nitromethane azeotropes and a toluene-nitromethane azeotrope, recycling the last-mentioned azeotrope to the crude toluene cut, cooling the first-mentioned mixture of azeotropes, separating the paraffin hydrocarbons from the nitromethane and recycling the nitromethane thus obtained to the crude toluene cut.

8. A process for separating substantially pure toluene from a crude toluene cut containing paraffin hydrocarbons boiling between about 195° F. and about 235° F., comprising, mixing about 50% to about 60% nitromethane, based on the amount of said paraffin hydrocarbons, with the crude toluene cut, fractionally distilling the resulting mixture to obtain substantially pure toluene boiling at about 232° F., withdrawing a mixture of paraffin-nitromethane azeotropes, cooling the azeotropes, separating the paraffin hydrocarbons containing dissolved nitromethane from the nitromethane containing dissolved paraffin hydrocarbons, recycling the separated nitromethane to the crude toluene cut, and withdrawing a toluene-nitromethane azeotrope and recycling same directly to the crude toluene cut.

9. A process as claimed in claim 8 and further comprising stripping the nitromethane containing dissolved nitromethane to separate substantially pure paraffin from a second mixture of paraffin-nitromethane azeotropes, and adding the second mixture of azeotropes to the first mixture of azeotropes prior to cooling and separating.

10. A process as claimed in claim 8 and further comprising stripping the ntiromethane containing dissolved paraffin hydrocarbons before recycling same to the crude toluene cut to separate a nitromethane-paraffin hydrocarbon azeotrope from substantially pure nitromethane and recycling the pure nitromethane to the crude toluene cut.

RICHARD D. GECKLER.
NATHAN FRAGEN.

CERTIFICATE OF CORRECTION.

Patent No. 2,316,126.                    April 6, 1943.

RICHARD D. GECKLER, ET AL.

It is hereby certified that error appears in the printed specification of the above numbered patent requiring correction as follows: Page 3, second column, line 14, claim 8, for "about 235° F." read --about 245° F.--; and line 29, claim 9, for "nitromethane" read --paraffin hydrocarbons--; and line 37, claim 10, for "ntiromethane" read --nitromethane--; and that the said Letters Patent should be read with this correction therein that the same may conform to the record of the case in the Patent Office.

Signed and sealed this 1st day of June, A. D. 1943.

(Seal)                                                         Henry Van Arsdale,
                                                      Acting Commissioner of Patents.